United States Patent
Hoebeke

(10) Patent No.: US 6,424,656 B1
(45) Date of Patent: Jul. 23, 2002

(54) METHOD TO ASSIGN UPSTREAM TIMESLOTS TO A NETWORK TERMINAL AND MEDIUM ACCESS CONTROLLER FOR PERFORMING SUCH A METHOD

(75) Inventor: Rudy Hoebeke, Deurne (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/304,984

(22) Filed: May 4, 1999

(30) Foreign Application Priority Data

May 15, 1998 (EP) .............................. 98401176

(51) Int. Cl.$^7$ ......................... H04L 12/28; H04L 12/56
(52) U.S. Cl. ...................................... 370/412; 370/468
(58) Field of Search ................................ 370/229, 230, 370/230.1, 231, 232, 235, 395.1, 395.7, 395.71, 395.72, 412, 389, 428, 429, 468

(56) References Cited

U.S. PATENT DOCUMENTS

| | | | |
|---|---|---|---|
| 5,631,906 A | * 5/1997 | Liu | 370/455 |
| 5,926,476 A | * 7/1999 | Ghaibeh | 370/395 |
| 5,936,943 A | * 8/1999 | Sakagami et al. | 370/244 |
| 5,940,369 A | * 8/1999 | Bhagavath et al. | 370/229 |
| 5,960,000 A | * 9/1999 | Ruszczyk et al. | 370/447 |
| 5,966,163 A | * 10/1999 | Lin et al. | 348/12 |

FOREIGN PATENT DOCUMENTS

| | | |
|---|---|---|
| EP | 0 544 975 A1 | 6/1993 |
| EP | 0 544 975 B1 | 6/1993 |
| EP | 0 729 245 A2 | 8/1996 |
| WO | WO 97/15993 | 5/1997 |

OTHER PUBLICATIONS

Cheng, L.: "Quality of services based on both call admission and cell scheduling" Computer Networks and ISDN Systems, vol. 29, No. 5, Apr. 1997, pp. 555–567, XP000686166.

* cited by examiner

*Primary Examiner*—Ajit Patel
(74) *Attorney, Agent, or Firm*—Sughrue Mion, PLLC

(57) ABSTRACT

Upstream timeslots are assigned to a network terminal in a time division multiplexed communications network, by means of queue grants, each of these queue grants corresponding to a storage queue within said network terminal and associated with a particular service category. The rate of the queue grant bitstream composed of succeeding occurrences of these queue grants is thereby determined from at least one parameter of a parameter set associated to the corresponding storage queue and from at least one other parameter of at least one other parameter set associated to at least one other storage queue within any of the network terminals within the communications network. The present invention relates as well to a medium access controller adapted to perform the method, to a central station including such a medium access controller and to a network terminal including these storage queues.

27 Claims, 2 Drawing Sheets

METHOD TO ASSIGN UPSTREAM TIMESLOTS TO A NETWORK TERMINAL AND MEDIUM ACCESS CONTROLLER FOR PERFORMING SUCH A METHOD

BACKGROUND OF THE INVENTION

The present invention relates to a method to assign upstream timeslots to a network terminal, as defined in the preamble of claim 1, a network terminal adapted to perform this method, as defined in the preamble of claim 13, and a medium access controller adapted to perform this method, as defined in the preamble of claim 17.

Such a method, network terminal and medium access controller are already known in the art, e.g. from the European patent specification EP 0 544 975 B1 "Time slot management system". Therein, a time slot management system is described, being part of a communication system including a main station coupled to each of a plurality of substations or user stations in a point-to-multipoint way, via the cascade connection of a common transmission link and an individual user link. The medium access controller of the present invention thus corresponds to the time slot management system of the prior art document, the network terminals to the substations or user stations, and the central station to the main station of this prior art document. The prior art time slot management system, includes a conversion and transmission means which is adapted for generating grants associated to the substations for downstream transmission to them. Upon receipt of the associated grant by the substations, these are then allowed to transmit a predetermined amount of upstream data packets to the central station. The prior art conversion and transmission means corresponds to the grant generation means of the present invention. In the prior art system, the rate with which succeeding occurrences of network terminal grants are generated is directly proportional to bandwidth information earlier transmitted upstream by the user stations, for instance the peak rate at which the user station intends to perform upstream packet transfer.

A drawback of the prior art system however is that it does not differentiate among different service categories pertaining to different packet or bitstreams the network terminals want to transfer upstream to the central station. Furthermore, to guarantee that each user station of the prior art system, can transfer its upstream data, the information related to the bandwidth requested by each user station or network terminal, usually corresponds to a peak cell rate, being the maximum rate at which this network terminal needs to upstream transfer its data packets. This prior art system is therefore functioning properly as long as the network terminals indeed have to transfer upstream bitstreams pertaining to a service category for which only a peak cell rate is specified, for instance the constant bit rate category as specified by the ATM Forum specification AF-TM-0056.000 dated April 1996 in case the bitstreams consist of ATM streams. In case however a network terminal intends to send packets pertaining to another, for instance the so-called "best effort" service category such as the unspecified bit rate service category, described in the same ATM Forum specification, reserving a maximum peak cell rate equivalent bandwidth during a certain time period, while the packets are only to be transferred at irregular instances in short bursts, seriously underutilises the capacity of the upstream link. At the some time, this may result in a high call blocking probability since the aggregate of the peak cell rates of the supported connections cannot exceed the available upstream capacity of the common transmission link, which was necessary to secure the correct operation of the prior art time slot management system.

SUMMARY OF THE INVENTION

An object of the present invention is to provide a method, a network terminal, and a medium access controller of the above known type but which allows to differentiate amongst different types of service categories pertaining to several bitstreams or connections to be upstream transmitted from this network terminal to the central station, and which at the same time, aims at a more efficient use of the capacity of the common upstream transmission link.

According to the invention, this object is achieved due to the fact that said method is further adapted as is described in the characteristic part of the first claim, that said network terminal is further adapted as described in the characteristic part of claim 13 and that said medium access controller is further adopted as described in the characteristic part of claim 17.

In this way, differentiation between different service categories is first realised within said network terminal by sorting or classifying, and temporarily storing the data packets to be upstream transmitted in different storage queues, each respective storage queue corresponding to a respective service category. This sorting is for instance based on header information, as will be explained more into detail in a following paragraph. Secondly, also the grant generation means is adapted to generate differentiated grants with respect to each different service category.

Furthermore, the grant rate associated to a particular storage queue is thereby not only determined from the parameters associated to this storage queue, but is also based upon at least one other parameter related to another storage queue within any network terminal of the communications network. This leads to a better partitioning of the available upstream bandwidth of the common transmission link since the upstream packet transmission rate will now be modulated, based on parameters associated to two competing bitstreams of which the packets are stored in these two storage queues.

These competing bitstreams can be upstream transmitted from the same network terminal, in which case the storage queues are included within this same network terminal as is stated in claim 2, or can be transmitted from two different terminals, in which case the storage queues are also belonging to two different network terminals as is stated in claim 3.

Another characteristic feature of the present invention is mentioned in claims 4 and 18.

The respective sets of parameters, associated to the respective storage queues, thereby include traffic and connection parameters associated to the respective bitstreams of which the data packets are stored within these queues, but also include a status parameter indicative of the status of these queues. As was stated by the previous claims 1 and 17, the grant rate associated to one queue, is then adapted based upon at least one parameter from both queue parameter sets. This implies that this queue grant rate may be solely dependent upon the status parameters, or solely on one of the traffic and connection parameters associated to both queues, or on a combination of both. In either case, the upstream data packet rate can be more efficiently controlled for matching the common transmission link capacity. Indeed, the traffic and connection parameters in general represent boundaries within which the actual traffic rates must lie. If the queue grant rate, which directly determines the corresponding upstream data transmission rate, is now dependent both on the own traffic limits, as well as on traffic limits of at least another, competing, bitstream, a better fit to the capacity of the upstream transmission link is obtained since a rate lying in between both boundaries will be the result.

In case only the status parameters are controlling the rate of the upstream transmission of the data packets, a medium access control method proportionally dividing the upstream link capacity amongst for instance the active bitstreams, thus for which the corresponding storage queues are not empty, is using that upstream link capacity in a much more efficient way than for instance the prior art system, which only took the requested bandwidth into account.

By combining the traffic and connection as well as the status parameters for determining the queue grant rate, it is evident that even a more optimal use of the upstream link capacity is obtained. Examples of such algorithms will be described into detail in a following paragraph of this document.

Yet a further characteristic feature of the present invention is mentioned in claims 5, 14 and 19.

In this way, the parameters associated to the respective queues are upstream transmitted by the network terminals themselves by means of upstream queue request messages. This upstream transmission is mandatory for the queue status parameters which can not be communicated to the medium access controller in another way. The traffic and connection parameters on the other hand can be incorporated within the same upstream queue request messages, as is for instance stated in claim 15, but can also be delivered to the medium access controller from for instance the central station where this information is centrally stored during the connection set-up phase.

Still another characteristic feature of the present invention is mentioned in claims 6 to 11 and 20 to 26.

By this, the queue grant rate, being directly related to the upstream associated packet transmission rate, is only adapted as long as the corresponding storage queue status parameter is complying with a predetermined criterion as is described by claims 6 and 20. In a previous paragraph such a criterion was already mentioned, namely that the queue should not be empty. Another criterion could be that at least a minimum number of cells are buffered in the storage queue. The storage queues of which the associated parameters are influencing the upstream packet transmission rate of one particular storage queue together constitute one group, whereas a subgroup of this group is formed by all storage queues from the group for which the status parameters fulfil this predetermined criterion. Claims 7 and 21 state that, in stead of using the status parameters extracted from the upstream request messages as such, first status related parameters are determined from them, after which step these status related parameters are then further used for determining the subgroup. The reason behind this latter solution is related to an eventual long delay between the arrival of two successive queue request messages. In this case downstream transmitted grants may already have caused a particular storage queue to be empty, a long time before the next request message with the indication of this new status has arrived. For these networks, the status related parameters are derived from the latest version of the received status parameters, but take already into account recently generated grants to this same storage queue. The thereby determined status related parameters thus aim at representing the actual status of the storage queues. In case however upstream request messages are arriving frequently enough to overcome this delay problem, there is no need for determining these status related parameters.

From the parameters associated to the storage queues of the subgroup, an excess bandwidth is then determined which will be proportionally divided amongst the storage queues of the subgroup. In case the group consists of the total of all storage queues within the network, and in case the grant rates associated to the storage queues for which the status parameters do not meet the predetermined criterion are set to zero, this excess bandwidth may correspond to an upstream bandwidth remaining available on the common transmission link when all bitstreams stored in the storage queues are already using the part determined by their traffic parameters, such as the peak cell rate or minimum cell rate. This excess bandwidth may be determined according to different methods, more details will be given in the descriptive part of this document. In addition, by proportionally dividing this excess bandwidth amongst these bitstreams of the subgroup, fairness amongst these competing bitstreams is obtained. This will also be explained into more detail in this descriptive part.

Still a further characteristic feature of the present invention is mentioned in claim 12.

Since the groups, the subgroups and the parameters may vary in time, the method is performed at particular predetermined instances, resulting in an adaptive method. These predetermined instances are for instance determined by the sending, at regular intervals of so-called PLOAM (Physical Layer Operation And Maintenance) cells, indicating to the network terminals that these are allowed to transmit their upstream request messages, as was also already the case for the prior art system.

The present invention relates as well to a central station including such a medium access controller as described by the above mentioned claims 19 to 26, as well as to a communications network including such a medium access controller and a network terminal as described in the above mentioned claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
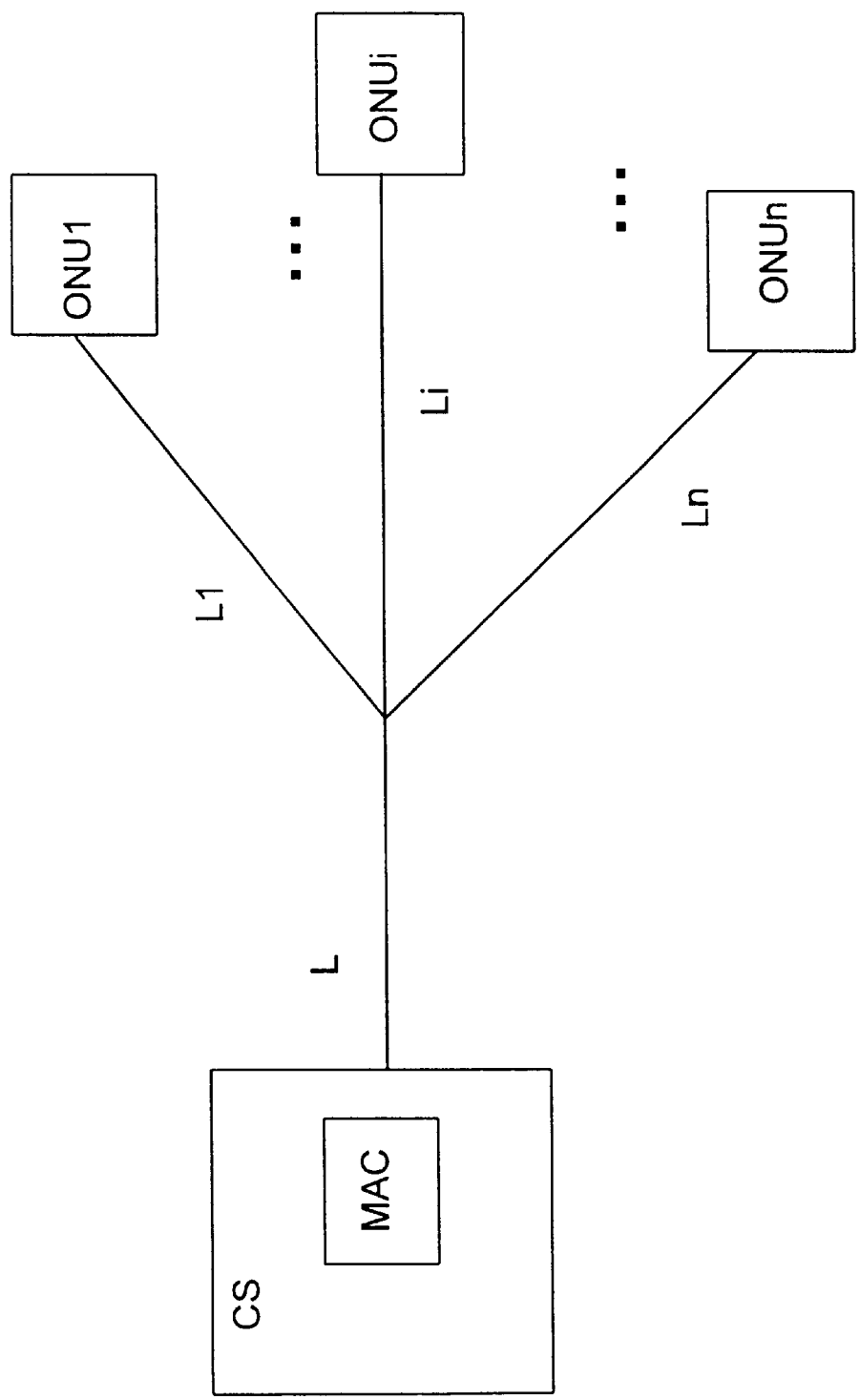
FIG. 1 represents a scheme of a communications network wherein the present invention is applied.

The communications network of FIG. 1 is composed of a central station CS and network terminals ONU1, . . . , ONUi, . . . to ONUn. the central station is coupled to these optical network units via the cascade connection of a common transmission link L, for instance an optical fibre link, and respective individual network terminal links L1, . . . ,Li, . . . ,Ln, also for instance consisting of optical fibres. The network hence has a point-to-multipoint architecture in the downstream direction, which is the direction from the central station CS to the network terminals ONU1 to ONUn, and a multipoint-to-point architecture in the upstream direction, i.e. the direction from the network terminals ONU1 to ONUn towards the central station CS.

In the downstream direction, the central station CS broadcasts information to all network terminals ONU1 to ONUn. The information is empacked in so-called downstream frames. In the opposite direction, the network terminals ONU1 to ONUn commonly share the link L in a time-multiplexed way. This means that different network terminals transmit information to the central station CS in different timeslots. Each network terminal thus sends upstream information in short bursts to the central station. The upstream timeslots constitute so-called upstream frames.

To be allowed to send a burst in an upstream timeslot, a network terminal, for instance ONUi, has to receive a permission or grant from medium access controller MAC, usually included within the central station CS, as is also drawn in FIG. 1.

At regular time intervals such permissions are downstream broadcasted by the medium access controller by means of a so-called PLOAM (Physical Layer Operation And Maintenance) cell wherein the contents of grant fields precisely define which network terminal is allowed to occupy which upstream timeslot.

In a multi-service network, network terminals are adapted to transmit several bitstreams, pertaining to several connections. In case of ATM bitstreams, pertaining to different ATM connections, these are associated with a set of traffic and connection parameters, related to the ATM service category associated with the connection, and which parameters are declared to the network by the user connected to the network terminal, during the connection-set-up, by means of signalling parameters. These traffic and connection parameters are for instance a peak cell rate, abbreviated with PCR, a minimum cell rate, abbreviated with MCR, a sustainable cell rate, abbreviated with SCR, etc. These parameters are standardised by the ATM Forum by specification AF-TM-0056.000 dated April 1996.

Figure 2:
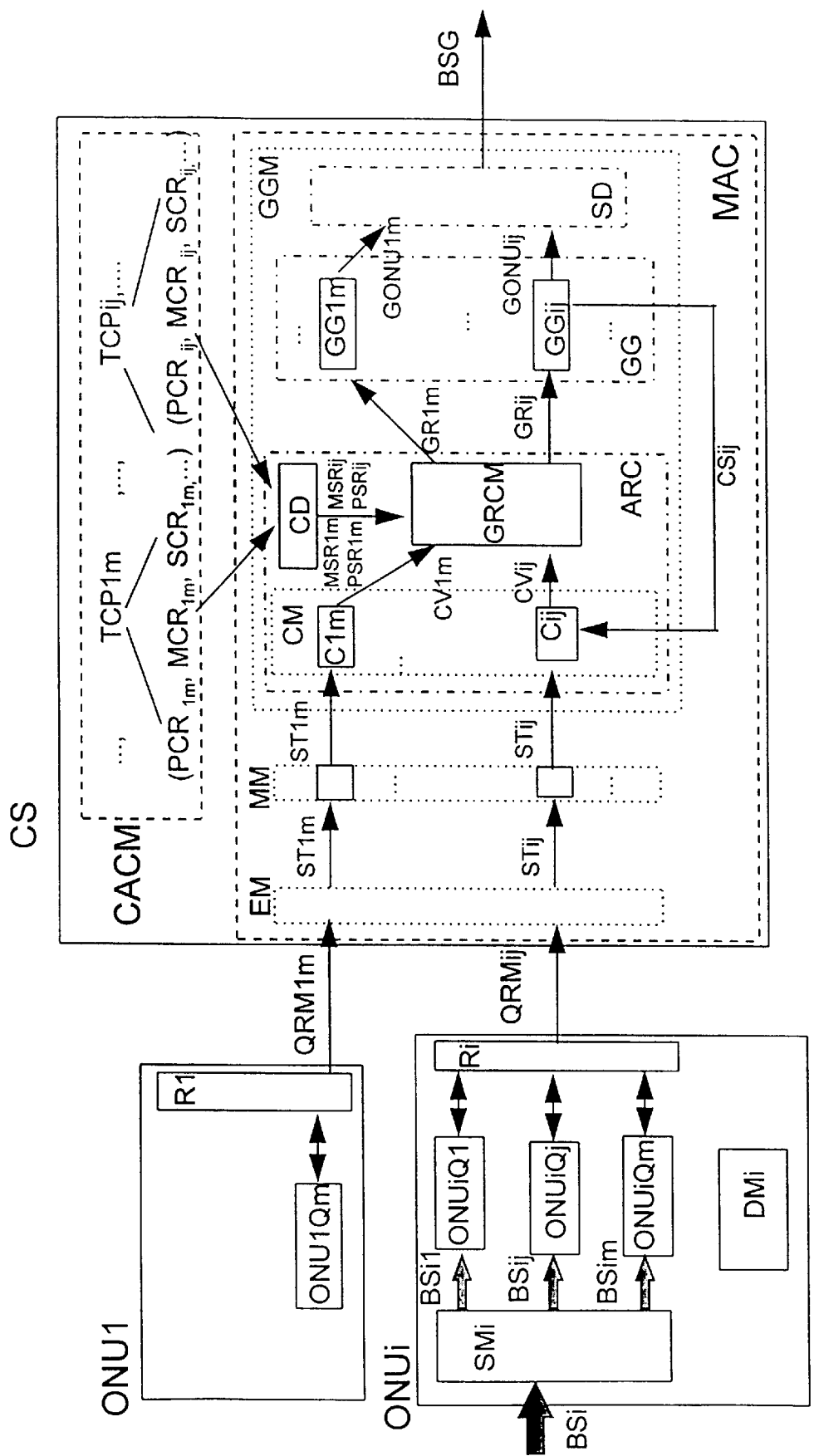
FIG. 2 represents a block scheme of network terminals ONUi and ONU1 of FIG. 1 as well of as the central station CS of this same figure, this central station including a medium access controller according to the invention

A network terminal, such as ONUi of FIGS. 1 and 2, adapted to transmit several bitstreams associated to several service categories, therefore includes for each service category one associated storage queue, in which subsequent cells or packets of the bitstreams associated with this service category, are stored. Thus in case four service categories are supported by this network terminal, four respective storage queues are included. These service categories may for instance comprise the constant bit rate, abbreviated with CBR, the variable bit rate, abbreviated with VBR, the available bit rate, abbreviated with ABR and the unspecified bit rate, abbreviated with UBR, service categories, again specified by the aforementioned ATM forum specification.

These storage queues included within network terminal ONUi are schematically depicted in FIG. 2 with ONUiQ1, . . . , ONUiQj, to ONUiQm, for the general case of m service categories. In order to classify incoming data packets from one incoming bitstream, in FIG. 2 denoted BSi, and composed of m individual bitstreams BSi1 to BSim, each individual bitstream pertaining to a respective one of the m service categories, the network terminal ONUi includes a sorting means SMi, adapted to classify incoming data packets from bitstream BSi, in accordance to their associated service category. SMi then includes m output terminals, one for each respective service category, which are coupled to the m respective storage queues. SMi is thereby adapted to extract the m individual bitstreams BSi1, . . . , BSij . . . ,BSim, succeeding packets of which are then stored in the respective associated storage queues ONUiQ1 to ONUiQm. For ATM networks, the sorting may be performed by examining the header of each ATM cell or packet. This header information includes the VPI/VCI identifier, which is during connection set-up uniquely linked to a particular service category. SMi then is adapted to extract this header information, compare this to connection set-up information previously captured and stored during the connection set-up phase, and to accordingly determine the associated service category. SMi is further adapted to forward these packets to one of the appropriate output terminals, which are further coupled to an appropriate storage queue. Since such sorting means are further known to a person skilled in the art, these will not be further described within this document.

For multi-service networks, it is clear that the grants transmitted to each network terminal, now not only have to include an identifier for the network terminal itself, but also an identifier concerning the service category of the bitstream for which transmission is allowed. Since per service category one storage queue is associated, the service category identifier thus also corresponds to the storage queue identifier.

The present invention therefore concerns a method for determining the grants associated per network terminal and per storage queue, as well as a medium access controller, which is adapted for executing this method. According to the subject method, the queue grant rate GRij for an individual storage queue, for instance ONUiQj, is determined from at least one parameter of a parameter set associated to the corresponding queue ONUiQj, and from at least one other parameter of at least one other parameter set associated to another storage queue. This other storage queue may be included in the same network terminal ONUi as the one comprising storage queue ONUiQj, but may also be located in another network terminal, for instance network terminal ONU1. For the latter case, parameters associated to for instance storage queue ONU1Qm, may be used for determining the queue grant rate GRij. The parameter set associated to each of the storage queues within the network, and for instance denoted Sij for storage queue ONUiQj, includes the traffic and connection parameters, denoted TCPij associated to the bitstream of which the data packets are stored in ONUiQj, and furthermore contains a parameter reflecting the status STij of this storage queue. This latter parameter may be simply indicating whether the queue is empty or not, or whether a minimum number of cells is available in the storage queue, but, in more sophisticated variants, may also indicate the amount of packets stored at a particular moment in time, within this storage queue.

Suppose that, besides one of the parameters associated to storage queue ONUiQj, at least one of the parameters of storage queue ONU1Qm is influencing the rate GRij. GRij is thus a function of a parameter Pij of the set Sij, and of a parameter P1$m$ of the set Si$m$. Several options are then possible. Pij as well as P1$m$ may correspond to the respective traffic and connection parameters, respectively denoted TCPij and TCP1$m$. For this variant of the method, these traffic and connection parameters may be explicitly communicated by the respective network terminals ONUi and ONU1 to the medium access controller MAC, by means of upstream queue request messages. Since these traffic and connection parameters were however already assigned to the individual bitstreams by the connection admission control function centrally residing within the network, these may therefore already have been communicated to the central station during this assignment phase. The central station CS in that case includes a central memory denoted CACM on FIG. 2 and adapted to store the traffic and connection parameters associated to all bitstreams or storage queues within the network and for which such a traffic a connection parameter was assigned. Since the medium access controller is also residing in this central station, this medium access controller can easily access this central memory, for getting the desired parameters such as TCPij and TCP1m in order to determine the grant rate GRij.

For another variant of the method Pij as well as P1m consist of the status parameters, STij and ST1m, of the respective storage queues ONUiQj and ONU1Qm. This information is however to be explicitly communicated in the upstream direction by the corresponding network terminals ONUi and ONU1 towards the medium access controller. This upstream communication occurs by means of upstream queue request messages, respectively denoted QRMij for the storage queue ONUiQj, and QRM1m for storage queue ONU1Qm. In this case the respective terminals ONUi and ONU1 include respective queue request generating means, respectively denoted Ri for ONUi and R1 for ONU1. These respective queue request generating means are adapted for determining the respective status parameters STij and ST1m, to incorporate them into respective upstream queue request messages, QRMij and QRM1m, and to further transmit these messages at regular instances upstream to the medium access controller MAC. The status parameters are determined at regular times, by means of the bi-directional links depicted on FIG. 2 between for instance Ri and the respective storage queues ONUiQ1 to ONUiQj. For R1 only one bi-directional link is shown between R1 and ONU1Qm, in order to not overload the drawing. The status parameters may consist of a simple indication of the queue being empty or not, whether or not a minimum number of cells are available in the queue or may consist of the real amount of cells, contained in this queue at a particular instance in time. The predetermined instances at which these queue request messages are generated and upstream transmitted are determined by the medium access controller itself, which regularly transmits downstream grants specially dedicated to the upstream transmission of this kind of request information from one or from a multiple of network terminals.

Such queue request messages, for instance QRMij including the status parameter STij of storage queue ONUiQj, and QRM1m including the status parameter ST1m of storage queue ONU1Qm, are regularly transmitted from the respective network terminals ONUi and ONU1 towards the medium access controller MAC. The latter further includes an extraction means, denoted EM in FIG. 2, which is adapted to receive from all network terminals their queue request messages, and to extract therefrom the parameters associated to their respective storage queues. These associated parameters are further transmitted by the extraction means EM to a memory means denoted MM in FIG. 2. This memory means includes, per storage queue, a memory location for storing the upstream communicated parameters associated to this storage queue. How to realise embodiments of such an extraction means and such a memory means is known by a person skilled in the art and this will therefore not be further described in this document. By means of an example, in FIG. 2 two output signals from the extraction means, serving as input signals to the memory means are depicted, namely the status parameters ST1m and STij.

The storage queues, of which the parameters, at a particular moment in time, are influencing the queue grant rate associated to a particular storage queue, for instance ONUiQj, are forming a so-called group of storage queues associated to that particular storage queue. For the previously mentioned example, ONUiQj and ONU1Qm are forming the group associated to storage queue ONUiQj.

Several algorithms are of course possible for determining the grant rate GRij. As already mentioned, GRij may be solely determined based on the status parameters STij and ST1m of the storage queues of the group mentioned by the previous example, these status parameters thereby also constituting a group of status parameters associated to storage queue ONUiQj. In this case, in general a method for calculating GRij first includes a step of checking the values of these status parameters of all storage queues of this group against a predetermined criterion. In a variant method, first status related parameters are derived from these status parameters by for instance already taking into account already generated grants, as will be described in a further paragraph of this document. These status related parameters aim at representing as close as possible the actual status of the queues within the medium access controller. They are introduced since it may take some time for an upstream queue request message to arrive at the central station, whereas at the same moment the already arrived grants may have caused the corresponding storage queue to be empty.

The thus determined status related parameters are then also used for determining the subgroup, by comparing them also against the same predetermined criterion as in the case merely the status parameters are used for determining the subgroup.

This predetermined criterion may for instance consist of comparing all status or status related parameters of the group with a predetermined value. Only these status or status related parameters exceeding this predetermined value are then further used by the method for calculating GRij, these storage queues thereby constituting a subgroup of storage queues associated to storage queue ONUiQj. Besides this, it also needs to be checked whether ONUiQj belongs to its own subgroup, by checking the own status or status related parameter STij against this predetermined criterion. In case the own status or status related parameter STij is not conform to this predetermined criterion, the corresponding queue grant rate may be put to zero, or to a low predetermined value, or even left unchanged. For the case where the predetermined criterion consists of checking whether the queues are empty or not, for one variant of the method the queue grant rate for empty queues is set to zero, since no data packets are to be transmitted. For a non-empty storage queue, the corresponding queue grant rate is then further determined by partitioning an excess bandwidth amongst the bitstreams of the subgroup. This excess bandwidth may for instance correspond to a predetermined capacity of the common upstream transmission link, whereby this is for instance distributed amongst the active bitstreams taking into account the amount of cells in their storage queue as proportionality factor.

However a lot of other variant methods for determining the queue grant rates are possible.

In case only traffic and connection parameters are used for determining a queue grant rate, without using the status parameters, again an excess bandwidth may as well be proportionally distributed over the different input bistreams of the group. In this case no subgroups are determined. The proportionality factor as well as the excess bandwidth may thereby be determined based upon the traffic and connection parameters of the individual storage queues of the group.

In the most general case however, the queue grant rate of a particular storage queue is determined from both status parameters and traffic and connection parameters associated to all storage queues of the group associated to this particular storage queue this group thereby thus also including the particular storage queue itself. In one particular variant of the method, used in for instance asynchronous passive optical networks, hereafter abbreviated with APON, a queue grant rate GRij is determined from the total of all traffic and connection parameters and all status parameters associated to all storage queues within the network. The group associated to storage queue ONUiQj is thus consisting of the whole plurality of all storage queues within the network.

One particular algorithm used for adapting the grant rate GRij within these APON networks will now be further described. This algorithm is performed by the calculating means ARC included within the medium access controller MAC. This medium access controller, as depicted in FIG. 2, includes the already mentioned extraction means EM and memory means MM, in which the respective status parameters of all storage queues within the network are first extracted and then temporarily stored. In order to not overload the drawing, only two status parameters STij and ST1m are depicted in this FIG. 2, as well as two network terminals having transmitted one of their upstream queue request messages. It is however evident that for the embodiment of the medium access controller MAC, used in for instance the APON network all network terminals are sending upstream queue request messages for each of their incorporated storage queues.

Within the embodiment of the medium access controller depicted in FIG. 2, the memory means MM is coupled to a counter means denoted CM, also included in the medium access controller. This counter means CM is composed of a plurality of individual counters, one counter assigned to each respective storage queue within the network. Each of these individual counters, such as for instance counter Cij receives as input parameters on one hand the status parameters STij of the corresponding storage queue ONUiQj, from the memory means MM, on the other hand a control signal CSij, generated by a grant generator GGij. The latter device will be described more extensively in a further paragraph. In the embodiment of the medium access controller used in the APON network, the respective status parameters STij are indicating the amount of cells or packets residing within the corresponding storage queue ONUiQj. This status parameter output signal is transmitted at regular time intervals from the memory location towards the counter means, and serves to reset the counters to this value. Upon receipt of the respective control signals from the respective grant generators, each counter decreases its output value with one, or with a predetermined value in case this same predetermined amount of cells is to be transmitted upstream from the corresponding storage queue ONUiQj upon receipt of a grant GONUiQj.

Upon receipt of a new queue request message, the thereby included updated value of the status parameter STij will however reset the counter to this new updated value. By this mechanism the corresponding counter output value always aims at reflecting the actual amount of cells within the queue ONUiQj, and thus the actual value of the status parameters at any point in time. This counter output value is therefore to be considered as a status related parameter for its corresponding storage queue.

It however needs to be remarked, that, dependent upon the frequency with which the request signals are transmitted by the individual network terminals, and read out by the extraction means, also embodiments of the medium access controller without such counter means are possible. In these embodiments the memory means is then directly coupled to the grant rate determining means GRCM which will be described in the following paragraph, whereby in this case no status related parameters are determined. In case the counter means is included in the MAC, this device may also directly be coupled to the extraction means EM, in which case the MAC does not include the memory means MM. A person skilled in the art is adapted in any of these cases how to realise different embodiments for these three devices, taken into account the frequency with which the request signals are arriving at the MAC.

In order to calculate an individual grant rate GRij, a grant rate calculating means GRCM is included within the medium access controller MAC, adapted for performing the method. This grant rate calculating means forms part of a calculating means ARC, which is coupled to the extraction means, and which, in some embodiments such as the one depicted in FIG. 2, may also include the aforementioned counter means CM. The grant rate calculating means is thereby adapted to receive the output signals from the corresponding counters, these signals thus constituting status related parameters, or in case this counter means is not present in the embodiment, output signals from the corresponding memory locations, these signals thus constituting status parameters. With these status or status related parameters as input parameters, the grant rate calculating means is adapted to check whether the associated storage queue ONUiQj is not empty. This grant rate calculating means is thereby adapted to compare the corresponding counter output value, denoted CVij in FIG. 2, with zero. In the case the storage queue was empty, the grant rate GRij, being an output signal of this grant rate calculating means, is set to zero. In case the counter value CVij is larger than zero, the grant rate calculating means will then further determine the subgroup associated to the storage queue ONUiQj, by comparing all counter values of all counters with zero. This is schematically depicted in FIG. 2 by the connection between the counter C1m towards the GRCM, whereby counter C1m transmits its output signal CV1m towards the grant rate calculating means GRCM. In order to not overload the drawing control signals from the calculating means towards the counter means for requesting these output values are not drawn.

For a non-empty storage queue ONUiQj the grant rate calculating means next determines an excess bandwidth which is to be proportionally distributed amongst the active storage queues of the subgroup. To this purpose, first the traffic and connection parameters, associated to the bitstreams of which packets are stored within storage queues of the subgroup, are to be converted into internal parameters used by the method. For the bitstream BSij, of which the packets are temporarily stored in storage queue ONUiQj, the following internal parameters are used as internal variables: a minimum service rate, abbreviated with MSRij, and a peak service rate, abbreviated with PSRij. A conversion between the presently standardised traffic and connection parameters as given by the aforementioned ATM Forum document is given in the following table:

| ATM service category | standardized parameters for the ATM service category | Standard parameter used for MSRij | standard parameter used for PSRij |
|---|---|---|---|
| CBR | PCRij | PCRij | PCRij |
| VBR | PCRij,SCRij,BTij | SCRij | PCRij |

-continued

| ATM service category | standardized parameters for the ATM service category | Standard parameter used for MSRij | standard parameter used for PSRij |
|---|---|---|---|
| ABR | PCRij,MCRij | MCRij | PCRij |
| UBR | PCRij,MCRij | MCRij | PCRij |

Conversion table between standardized ATM-Forum traffic and connection parameters, and the parameters MSRij and PSRij used by the algorithm. Following abbreviations are used:

CBR: constant bit rate service category

VBR variable bit rate service category

ABR: available bit rate service category

UBR: unspecified bit rate service category

PCRij: peak cell rate associated to bitstream BSij

SCRij: sustainable cell rate associated to bitstream BSij

MCRij minimum cell rate associated to bitstream BSij

BTij: burst tolerance associated to bitstream BSij

MSRij: minimum service rate parameter for bitstream BSij

PSRij: peak service rate parameter for bitstream BSij

Remark that this table represents only one example of conversion between standardised parameters and the internal parameters used by the algorithm. Other conversion methods are possible as well. This conversion is performed by a conversion device denoted CD and included in the calculating means ARC. The conversion device is adapted to receive from the connection admission control memory denoted CACM and residing within the central station CS of which also the medium access controller MAC forms part, the values of the standardized traffic and connection parameters. These are by way of example represented by the traffic and connection parameters TCP1$m$ associated to storage queue ONU1Qm, and the traffic and connection parameters TCPij associated to the storage queue ONUiQj. These traffic and connection parameters thereby thus include the peak cell rates PCR1$m$, resp. PCRij, the minimum cell rates MCR1$m$, resp. MCRij, the sustainable cell rates SCR1$m$, resp, SCRij, and others which are currently not used by the method, and which are therefore also not represented in FIG. 2.

These converted parameters, denoted MSR1$m$, PSR1$m$, MSRij and PSRij, are then delivered to the grant rate calculating means GRCM included within the calculating means ARC.

The grant rate calculating means is further adapted to calculate 3 global parameters during the execution of the algorithm: an active peak service rate, abbreviated with APSR, an active minimum service rate, abbreviated with AMSR, and an allowed service rate, abbreviated with ASR. The ASR is initialised at the start of the operation of the medium access controller to a predetermined value ASR0, in general ASR0 corresponding to the upstream capacity of the common transmission link. AMSR and APRS are initialised as zero.

The algorithm uses the following rules

1. APSR=Σ PSRkl
2. AMSR=Σ MSRkl
3. ASR=ASR0−Σ MSRkl with PSRkl,MSRkl representing the peak service rate, respectively the minimum service rate of an arbitrary storage queue ONUkQl (not shown in FIG. 2) of the subgroup associated to storage queue ONUiQj. The summations are performed over all storage queues of the subgroup.

$$4.\ GRij = \min\left(PSRij,\ MSRij + \frac{\Delta ij}{\Delta} \times ASR\right)$$

with Δij=PSRij−MSRij
Δ=APSR−AMSR with PSRij, MSRij respectively representing the peak service rate and the minimum service rate associated to the bitstream of which the packets are temporarily stored within storage queue ONUiQj.

Rule 4 thus implies that the grant rate GRij is determined as the minimum of two values, a first value being the associated peak service rate PSRij, a second value being a proportional division of the allowed service rate ASR amongst all bitstreams of the subgroup. An excess bandwidth, corresponding to this allowed service rate, is thus determined as the difference between the initialised value ASR0, which in general corresponds to the capacity of the common transmission link, and the sum of all minimum service rates of all bitstreams of the subgroup, in this case consisting of all active bitstreams. The thus determined value of ASR corresponds to an excess bandwidth remaining available at the common transmission link after all minimum service rates of all active bitstreams are used. This excess bandwidth is then proportionally divided amongst all active bitstreams or storage queues, based on their negotiated traffic contract parameters related to PSRij and MSRij, while non of the storage queues is arbitrarily discriminated or favoured. Fairness is thus obtained.

It further needs to be remarked that when the counters are updated, the global parameters APSR, AMSR and ASR need also to be updated. The algorithm is executed at predetermined instances, in order to closely follow the latest version of the status related parameters. This algorithm can thus be considered as an adaptive algorithm, following as closely as possible the status of the queues within the network terminals.

Other implementations exist whereby incremental differences between successive values of the status related parameters are used for determining the variables used by the algorithm. A lot of other algorithms are of course also possible.

Although not drawn in FIG. 2 for simplicity reasons, circuitry for the control and synchronisation between the calculating means ARC and the connection admission control memory CACM as well as between the counters of CM and the calculating means is necessary, for proper operation of the method. A person skilled in the art is capable of realising such circuitry. Since these control circuits are however not relevant to the invention they will not be further discussed in this document.

The grant rates for each of the active storage queues are determined using the same algorithm. The calculations may be performed in parallel or sequentially by the calculating means, depending upon the processing capacity of such means. Nevertheless, from the formula's of the algorithm it is clear that a lot of calculations can be shared.

The grant rate calculating means is further adapted to deliver these respective grant rates, by way of example represented by GR1$m$ for the grant rate associated to storage queue ONU1Qm and GRij for the grant rate associated to storage queue ONUiQj, as input signals to a grant generator denoted GG. This grant generator consists of a plurality of individual grant generation devices, such as GG1$m$ and GGij. An individual grant generation device, for instance GGij, is adapted to generate a succession of respective queue grant messages, such that the rate of the bitstream composed of successive occurrences of these queue grant messages corresponds to GRij. The principles for converting these rates to such a bitstream of grants is commonly known to a person skilled in the art, and will therefore not be further described into detail in this document.

Furthermore, upon generation of each grant GONUij by the grant generation device GGij, a control signal denoted CSij is generated by this grant generation device GGij and supplied on a control output terminal of the grant generation device to the corresponding counter Cij. Therefore, each of the grant generating devices, includes a control output terminal which is coupled to a control input terminal of a corresponding counter, associated to the same storage queue. Each time a grant is generated, the value of the control signal delivered to the counter equals the amount of cells which are allowed to be upstream transmitted by the corresponding storage queues, after receipt of an associated downstream grant. In case one cell is to be transmitted upstream, this value is thus one, and the corresponding counter will decrease its output value with one. In order to not overload the drawing on FIG. 2, only control signal CSij is shown.

The thus determined individual queue grant bitstreams are further scheduled by a scheduler device, denoted SD in FIG. 2, which is adapted to generate from these nxm individual bitstreams one downstream bitstream. The simplest implementation of such a scheduler device may consist of a multiplexer, but also more sophisticated scheduler devices can be used, whereby more complex scheduling or work conserving service discipline methods are realised. These are for instance described in the article "Service Disciplines for Guaranteed Performance Service in Packet-Switching Networks" by H. Zhang, Proceedings of the IEEE, 83 (10), October 1995. Therein on the pages 5 to 9 a series of these work-conserving service disciplines is discussed. These scheduler means furthermore may consist of several stages, first including a scheduler device to schedule the nxm queue grant bitstreams into m queues, one queue per service category, and to further multiplex then the bitstreams from these m queues into one global downstream bitstream BSG of grants.

It further is to be remarked that since the downstream bitstream of grants BSG now includes succeeding occurrences of queue grants, each network terminal also is further adapted to determine from the bitstream of grants, the respective queue grants associated to the storage queues which are included within this network terminal. To this purpose a detecting means is included in each of these network terminals, denoted DMi for network terminal ONUi in FIG. 2. In order to not overload this figure, neither the input nor the output signals of this detecting means are drawn. This detecting means is adapted to receive the bitstream of grants, to extract therefrom the queue grants associated to the respective storage queues within ONUi, and, upon detection of such a queue grant, to generate a corresponding control signal towards the corresponding storage queue, allowing this storage queue to upstream transmit this predetermined amount of packets towards the central station CS. Since also such detecting means are known to persons skilled in the art, more detailed embodiments will not be described in this document.

Although the medium access control method and controller have been described for APON networks, they may as well be used for any network based on time division multiplexing, such as hybrid fiber coax networks, satellite networks and so on.

While the principles of the invention have been described above in connection with specific apparatus, it is to be clearly understood that this description is made only by way of example and not as a limitation on the scope of the invention, as defined in the appended claims.

I claim:

1. Method to assign upstream timeslots to a network terminal (ONUi) of a first plurality of network terminals (ONU1, . . . , ONUi, . . . , ONUn) in a communications network wherein a central station (CS) is coupled to said plurality of network terminals (ONU1, . . . , ONUi, . . . , ONUn) via the cascade connection of a common transmission link (L) and respective individual network terminal links (L1, . . . , Li, . . . , Ln) and wherein said network terminals (ONU1, . . . , ONUi, . . . ONUn) are adapted to transmit upstream data packets to said central station (CS) in a time multiplexed way over said common transmission link (L) using said upstream time slots, which are assigned to said network terminals by means of a downstream bitstream (BSG) of network terminal grants, said downstream bitstream being generated by a medium access controller (MAC) included within said communications network, characterised in that within said network terminals (ONU1, . . . , ONUi, . . . , ONUn) said upstream data packets are classified in accordance to their associated service categories and temporarily stored in a second plurality of storage queues, each respective storage queue of said second plurality being related to a respective one of said service categories (1, . . . , i . . . , m), a grant (GONUi), associated to said network terminal (ONUi), includes a third plurality of queue grants (GONUi1, . . . , GONUij, . . . , GONUim) each associated to a respective storage queue (ONUiQ1, . . . , ONUiQj, ONUiQj) within said network terminal (ONUi), whereby a queue grant (GONUij) of said third plurality is enabling said network terminal (ONUi) to transfer a predetermined amount of upstream data packets from its corresponding storage queue (ONUiQj), and whereby the rate (GRij) of the queue grant bitstream composed of succeeding occurrences of said queue grants (GONUij), is determined from at least one parameter (Pij) of a parameter set (Sij) associated to said corresponding storage queue (ONUiQj), and from at least one other parameter (P1$m$) of at least one other parameter set (S1$m$) associated to at least one other storage queue (ONU1Qm) within any of said network terminals within said communications network.

2. Method according to claim 1 characterised in that said at least one other storage queue is included within said network terminal (ONUi).

3. Method according to claim 1 characterised in that said at least one other storage queue (ONU1Qm) is included in at least one other network terminal (ONU1) of said plurality of network terminals.

4. Method according to claim 1 characterised in that said parameter set (Sij) associated to said corresponding storage queue (ONUiQj) includes traffic and connection parameters (TCPij) related to the data packets stored in said corresponding storage queue (ONUiQj), and a status parameter (STij) related to the status of said corresponding storage queue, said at least one parameter set (S1m) associated to said at least one other storage queue (ONU1Qm) includes traffic and connection parameters (TCP1m) related to data packets stored in said at least one other storage queue (ONU1Qm) and at least one status parameter (ST1m) related to the status of said at least one other storage queue.

5. Method according to claim 1 said at least one parameter (Pij) is upstream communicated to said medium access controller (MAC) by said network terminal (ONUi) by means of a corresponding upstream queue request message (QRMij).

said at least one other parameter (P1m) is upstream communicated to said medium access controller (MAC) by the at least one other network terminal (ONU1) including said at least one other storage queue (ONU1Qm), by means of at least one other queue request message (QRM1m).

6. Method according to claim 5 characterised in that for said corresponding storage queue (ONUiQj) and said at least one other storage queue (ONU1Qm) constituting a group of storage queues, associated to said corresponding storage queue (ONUiQj)

for said status parameter (STij) of said corresponding storage queue (ONUiQj) and said at least one other status parameter (ST1m) of said at least one other storage queue constituting a group of status parameters, associated to said corresponding storage queue (ONUiQj), said method includes a step of determining a subgroup of storage queues within said group of storage queues, based on all status parameters of said group of status parameters, said subgroup thereby comprising storage queues of said group of storage queues for which said status parameters respond to a predetermined criterion.

7. Method according to claim 5 characterised in that for said corresponding storage queue (ONUiQj) and said at least one other storage queue (ONU1Qm) constituting a group of storage queues, associated to said corresponding storage queue (ONUiQj)

for said status parameter (STij) of said corresponding storage queue (ONUiQj) and said at least one other status parameter (ST1m) of said at least one other storage queue constituting a group of status parameters, associated to said corresponding storage queue (ONUiQj), said method includes a step of determining, for all status parameters within said group of status parameters, status related parameters, said method further includes a next step of determining a subgroup of storage queues within said group of storage queues, based on all of said status related parameters, said subgroup thereby comprising storage queues of said group of storage queues for which said status related parameters respond to a predetermined criterion.

8. Method according to claim 6 characterised in that said method includes a step of checking whether said corresponding storage queue (ONUiQj) belongs to said subgroup, associated to said corresponding storage queue (ONUiQj).

9. Method according to claim 8 characterised in that in case said corresponding storage queue (ONUiQj) belongs to said subgroup, said rate (GRij) of said queue grant bitstream is dependent on a proportional part of an excess bandwidth.

10. Method according to claim 9 characterised in that said excess bandwidth is determined from the values of said at least one of the parameters of each parameter set associated to each storage queue of said subgroup.

11. Method according to claim 10 characterised in that said proportional part is determined from the values of said at least one of the parameters of each parameter set associated to each storage queue of said subgroup.

12. Method according to claim 11 characterised in that said method is performed at predetermined instances.

13. Network terminal (ONUi) of a communications network wherein a central station (CS) is coupled to a first plurality of network terminals (ONU1, ..., ONUi, ..., ONUn) including said network terminal (QNUi), via the cascade connection of a common transmission link (L) and respective individual network terminal links(L1, ..., Li, ..., Ln)

said network terminal (ONUi) being adapted to detect an associated grant (GONUi) within a downstream bitstream of network terminal grants (BSG) transmitted from a medium access controller (MAC) included in said communications network, to said network terminals (ONU1, ..., QNUi, ..., QNUn)

said network terminal (QNUi) being further adapted to transmit a predetermined amount of said upstream data packets to said central station (CS) upon detecting of said associated grant (GONUi), characterised in that said network terminal (ONUi) includes sorting means (SMi) adapted to classify said upstream data packets in accordance to their associated service category, said sorting means (SMi) including a plurality of output terminals, each of which is coupled to a respective storage queue of a second plurality of storage queues (ONUiQ1, ..., ONUiQj, ..., ONUiQj) included within said network terminal (ONUi), each storage queue of said second plurality being related to a respective one of said service categories (1, ..., j, ..., m), and adapted to temporarily store sorted data packets delivered by said sorting means (SMi)

said network terminal (ONUi) further includes detecting means (DMi) adapted to discriminate within said bitstream of grants, respective queue grants of a third plurality (GONUi1, ..., GONUij, ..., GONUim), each respective queue grant being associated to a respective storage queue of said second plurality (ONUiQ1, ..., ONUiQj, ..., ONUiQj), said detecting means being further adapted to, upon detecting of a respective queue grant (GONUij) of said third plurality, generate a respective control signal to the corresponding storage queue (ONUiQj)

said corresponding storage queue (ONUiQj) is thereby adapted to transmit, upon receipt of said respective control signal, a predetermined amount of said upstream information packets, to said central station (CS).

14. Network terminal (ONUi) according to claim 13 characterised in that said network terminal (ONUi) further includes request generating means (Ri) which is adapted to determine, for at least one of said storage queues (ONUiQj), at least one associated parameter (Pij) and to transmit said at least one associated parameter to said medium access controller (MAC) by means of a corresponding upstream queue request message (QRMij) being an output signal of said request generating means (Ri).

15. Network terminal (ONUi) according to claim 14 characterised in that said at least one associated parameter (Pij) associated to said at least one storage queue (ONUiQj) consists of traffic and connection parameters (TCPij) associated to the data packets stored within said at least one storage queue (ONUiQj).

16. Network terminal according to claim 14 characterised in that said at least one associated parameter (Pij) associated to a respective storage queue (ONUiQj) consists of a status parameter (STij) related to the status of said respective storage queue (ONUiQj).

17. Medium access controller (MAC) of a communications network wherein a central station (CS) is coupled to a first plurality of network terminals (ONU1, ..., ONUi, ..., ONUn) via the cascade connection of a common transmission link (L) and respective individual network terminal links (L1, ..., Li, ..., Ln) and wherein said network terminals (ONU1, ..., ONUi, ..., ONUn) are adapted to transmit upstream data packets to said central station (CS) in a time multiplexed way over said common transmission link using time slots, said medium access controller (MAC) including grant generation means (GGM) adapted to determine a downstream bitstream of network terminal grants (BSG) and to transmit said bitstream to said network terminals of said first plurality, characterised in that said grant generation means (GGM) is further adapted to generate at least one network terminal grant as a third plurality of queue grants (GONUi1, ..., GONUij, ..., GONUim) each queue grant of said third plurality being associated to a respective storage queue (ONUiQ1, ..., ONUiQj, ..., ONUiQj) within at least one network terminal (ONUi) associated to said at least one network terminal grant (GONUi), said grant generation means (GGM) thereby includes calculating means (ARC) adapted to determine the rate (GRij) of succeeding occurrences of a queue grant (GONUij) of said third plurality, from at least one parameter (Pij) of a parameter set (Sij) associated to a corresponding storage queue (ONUiQj) to said queue grant (GONUij), and from at least one other parameter (P1m) of at least one other parameter set (S1m) associated to at least one other storage queue (ONU1Qm) within any of said network terminals within said communications network .

18. Medium access controller according to claim 17 characterised in that said medium access controller (MAC) further includes extraction means (EM) adapted to extract, from at least one corresponding upstream queue request message (QRMij), and respectively from at least one other upstream queue request message (QRM1m), said at least one parameter (Pij) of said parameter set (Sij) associated to said corresponding storage queue (ONUiQj), and respectively said at least one other parameter (P1m) of said at least one other parameter set (S1m) associated to said at least one other storage queue (ONU1Qm), and to deliver said at least one parameter (Pij), and respectively said at least one other parameter (P1m) as output signals of said extraction means (EM).

19. Medium access controller according to claim 17 characterised in that said parameter set (Sij) associated to said corresponding storage queue (ONUiQj) includes traffic and connection parameters (TCPij) related to data packets stored in said corresponding storage queue (ONUiQj) and a status parameter (STij) related to the status of said corresponding storage queue, said at least one other parameter set (S1m)) associated to said at least one other storage queue (ONU1Qm) includes traffic and connection parameters (TCP1m) related to data packets stored in said at least one other storage queue (ONU1Qm) and at least one status parameter (ST1m) related to the status of said at least one other storage queue (ONU1Qm).

20. Medium access controller according to claim 18 characterised in that said at least one, respectively said at least one other, queue request message includes said at least one, respectively said at least one other status parameter, for said corresponding storage queue (ONUiQj) and said at least one other storage queue (ONU1Qm) constituting a group of storage queues, associated to said corresponding storage queue (ONUiQj)

for said status parameter (STij) of said corresponding storage queue (ONUiQj) and said at least one other status parameter (ST1m) of said at least one other storage queue (ONU1Qm) constituting a group of status parameters, associated to said corresponding storage queue an input terminal of said calculation means (ARC) is coupled to an output terminal of said extraction means (EM), said calculation means is thereby adapted to receive all status parameters (Sij,S1m) of said group (ONUiQj,ONU1Qm) and to determine therefrom a subgroup constituting of storage queues within said group of storage queues for which said status parameters respond to a predetermined criterion.

21. Medium access controller according to claim 18 characterised in that said at least one, respectively said at least one other, queue request message includes said at least one, respectively said at least one other status parameter, for said corresponding storage queue (ONUiQj) and said at least one other storage queue (ONU1Qm) constituting a group of storage queues, associated to said corresponding storage queue (ONUiQj)

for said status parameter (STij) of said corresponding storage queue (ONUiQj) and said at least one other status parameter (ST1m) of said at least one other storage queue (ONU1Qm) constituting a group of status parameters, associated to said corresponding storage queue an input terminal of said calculation means (ARC) is coupled to an output terminal of said extraction means (EM), said calculation means is thereby adapted to receive all status parameters (Sij,S1m) of said group (ONUiQj,ONU1Qm), to determine therefrom status related parameters, and to determine from said status related parameters a subgroup constituting of storage queues within said group of storage queues for which said status related parameters respond to a predetermined criterion.

22. Medium access controller according to claim 21 characterised in that said calculation means (ARC) includes counter means (CM), adapted to determine from said status parameters of said group, said status related parameters of said group.

23. Medium access controller according to claim 20 characterised in that said calculating means (ARC) is further adapted to determine whether said corresponding storage queue (ONUiQj) belongs to said subgroup, associated to said corresponding storage queue (ONUiQj).

24. Medium access controller according to claim 23 characterised in that in case said corresponding storage queue belongs to said subgroup, said calculating means (ARC) is further adapted to calculate said rate (GRij) of said succeeding occurrences of said queue grant (GONUij) to be dependent on a proportional part of an excess bandwidth.

25. Medium access controller according to claim 24 characterised in that said calculating means (ARC) is further adapted to determine said excess bandwidth from the values of said at least one of the parameters of each parameter set associated to each storage queue of said subgroup.

26. Medium access controller according to claim 25 characterised in that said calculating means is further adapted to determine said proportional part of said excess bandwidth from the values of said at least one of the parameters of each parameter set associated to each storage queue of said subgroup.

27. Medium access controller according claim 17 characterised in that said medium access controller is included in said central station (CS).

* * * * *